Patented Jan. 2, 1951

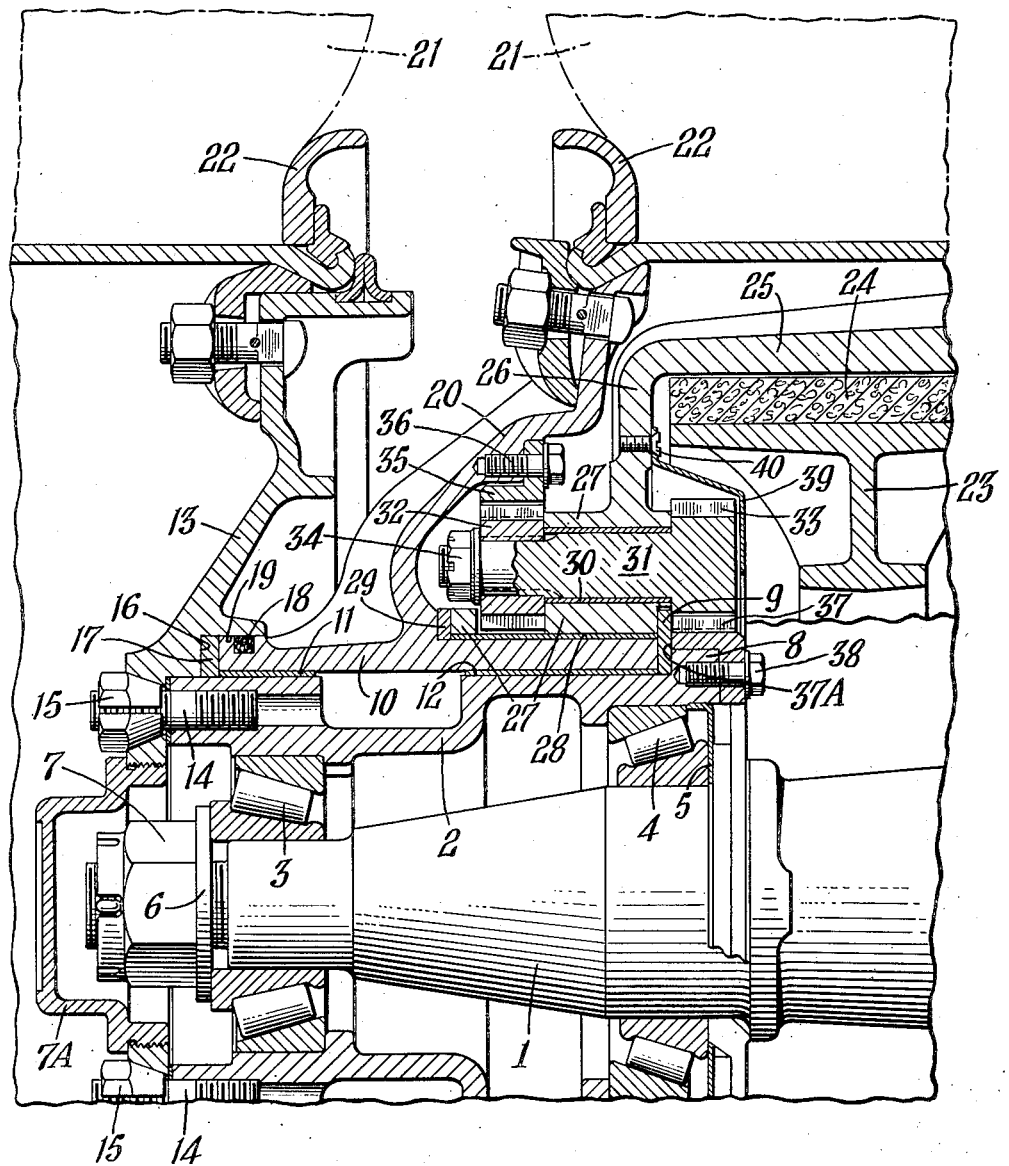

2,536,119

UNITED STATES PATENT OFFICE 2,536,119

DUAL WHEEL ASSEMBLY

Charles S. Ash, Milford, Mich.

Application October 1, 1945, Serial No. 619,658

9 Claims. (Cl. 301—36)

This invention relates to differential dual wheels and refers more particularly to the combination with a pair of coaxially mounted independently rotatable dual wheels of means for differentially braking said wheels.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

The present invention has for its object the provision of a dual wheel assembly the two wheels of which are differentially connected, and means for differentially braking said wheels, the dual wheel and brake being of simpler construction and easier to assemble and take apart than previous constructions serving a similar purpose.

In accordance with the illustrative embodiment of the present invention there is provided a spindle on which is antifractionally mounted a sleeve comprising an exterior flange at its inner end. The inner wheel hub is rotatably supported on the sleeve, with suitable bearing material interposed and at either end. The outer wheel web is bolted to the sleeve, providing a thrust surface for the inner wheel hub, the opposed thrust surface being the sleeve flange. The brakedrum hub is supported rotatably on the inner wheel, to the inner side of the web thereof, the hub further carrying in axial bush holes shafts carrying planetary spur pinions at either end, the outer pinions engaging a radially outer sun gear carried by the inner wheel, and the inner pinion engaging a radially inner sun gear bolted to the sleeve flange and further constituting a thrust bearing for the brakedrum hub.

The above construction may be disassembled partially or totally, each step of disassembly being very simple. The outer wheel is removed simply by unbolting. The inner wheel, brakedrum and differential can then be slid axially outward and the brakedrum and pinions can then be slid off the inner wheel. It is notable that the antifrictional mounting of the sleeve has not been disturbed.

It will be understood that the foregoing general description and the following detailed description as well are exemplary and explanatory of the invention but are not restrictive thereof.

Referring now to the illustrative embodiment of the invention as shown in the drawing, a spindle 1 carries a sleeve 2 mounted thereon by means of antifriction radial and thrust bearings 3 and 4, bearing 4 abutting shoulder 5 of spindle 1 and bearing 3 being axially positioned by washer 6 and castellated nut 7. The outer end of the sleeve is closed by a dust cap 7A in threaded engagement with the outer wheel mentioned hereafter. A small exterior flange 8 is located at the inner end of the sleeve.

A flat annular thrust bearing 9 abuts flange 8, and the elongated hub 10 of the inner wheel is rotatably supported on bearings 11, 12 on the sleeve and abutting bearing 9. The outer wheel web 13 is bolted as by studs 14 and slitted countersunk spring nuts 15 to the outer face of sleeve 2, and has an interior radial surface 16 abutting the thrust bearing 17. An annular body 18 of felt or other packing material is recessed in the hub 10 engaging an interior cylindrical surface 19 of web 13 to exclude dust etc. from the bearings and to retain lubricant. Web 13 of the outer wheel and web 20 of the inner wheel detachably support in conventional manner tires 21 and tire supporting rims indicated as entireties as 22.

A brake shoe 23 carrying brake lining 24 is suitably anchored to the vehicle by means not shown and is engageable with a brakedrum 25 which is integrally connected by web 26 to hub 27, the latter being rotatably supported on hub 10 by interposed radial bearing 28 and between thrust bearings 9 and 29.

The hub 27 is formed with a plurality of axially extending bushed cylindrical apertures 30 in which are supported for rotation on their respective axes the pinion shafts 31 carrying planetary pinions 32, 33 at opposite ends, pinion 33 being integral with the shaft and pinion 32 being keyed thereto and axially positioned by castellated nut 34.

Internally toothed sun gear 35 is fastened to web 20 of the inner wheel as by capscrews 36 and engages planet pinions 32. Sun gear 37 is fastened as by capscrews 38 to flange 8, being thus connected through sleeve 2 to outer wheel 13. Sun gear 37 engages planet pinions 33 and has a thrust surface 37A abutting thrust bearing 9.

A dust shield 39 is fastened as by screws 40 to web 26 and partially covers pinions 33, which are also protected by centrifugal force from the entry of most foreign matter.

Advantages of the above construction include the feature that in the absence of differential action between the wheels the rotation of the wheels is borne by the antifriction bearings 3, 4. Further, the assembly may be completely taken down to sleeve 2 without disturbing the critical thrust setting of bearings 3, 4 maintained by nut 7. The inner wheel hub 10 further has ample bearing on sleeve 2 and the brakedrum hub 27 also has ample bearing on hub 10. Disassembly of the respective major components radially outside sleeve 2 is accomplished by release of nuts 15, releasing successively by axial movement the outer wheel, the inner wheel, and the brakedrum, as described earlier.

The invention in its broader aspects is not limited to the specific mechanisms shown and described but departures may be made therefrom within the scope of the accompanying claims without departing from the principles of the invention and without sacrificing its chief advantage.

What I claim is:

1. In a differential dual wheel assembly, in combination, a sleeve adapted to be rotatably supported on a spindle, a hub for an inner wheel rotatably supported on said sleeve, a brake means rotatably supported on said hub, an outer wheel fast to said sleeve, and means differentially interconnecting said hub, said brake means and said sleeve.

2. In a differential dual wheel assembly, in combination, a sleeve adapted to be rotatably supported on a spindle, said sleeve comprising a flange at its inner end, an inner wheel hub and a brake means coaxially supported for independent rotation on said sleeve, and an outer wheel fast to said sleeve, said hub, said brake means and said sleeve being differentially interconnected, said flange and said outer wheel comprising thrust bearing surfaces for said hub.

3. In a differential dual wheel assembly, in combination, a sleeve adapted to be rotatably supported on a spindle, said sleeve comprising a differential gear component, an inner wheel and a brake means having bearing portions telescopically arranged and coaxially supported on said sleeve for independent rotation, and an outer wheel fast to said sleeve, said brake means and said inner wheel being differentially connected to each other and to said component, said component and said outer wheel having formed thereon thrust bearing surfaces for said inner wheel and brake means.

4. In a differential dual wheel assembly, in combination, a sleeve adapted to be rotatably supported on a spindle, an inner wheel and a brake means coaxially supported for independent rotation on said sleeve, an outer wheel fast to said sleeve and having formed thereon a thrust bearing surface for said inner wheel, and thrust bearing means for said inner wheel detachably secured to the inner end of said sleeve.

5. In a differential dual wheel assembly, in combination, a sleeve adapted to be rotatably supported on a spindle, an outer wheel fast to said sleeve, a hub for an inner wheel rotatably supported on said sleeve, a hub for a brake means rotatably supported on said wheel hub, said brake hub comprising circumferentially spaced axially extending shafts supported therein for rotation on their respective axes, and planetary pinions connected to said shafts and engaging sun gears connected to said wheels for differentially interconnecting said wheels and said brake means.

6. In a differential dual wheel assembly, in combination, a sleeve adapted to be rotatably supported on a spindle, an outer wheel fast to said sleeve, a hub for an inner wheel rotatably supported on said sleeve, a hub for a brake means rotatably supported on said wheel hub, said brake hub comprising circumferentially spaced axially extending shafts supported therein for rotation on their respective axes, and planetary pinions connected to both ends of said shafts, an internally toothed sun gear connected to said inner wheel and engaging the axially outwardly located pinions and a sun gear connected to said sleeve and engaging the axially inwardly located pinions for differentially interconnecting said wheels and said brake means.

7. In a differential dual wheel assembly, in combination, a sleeve adapted to be rotatably supported on a spindle, an outer wheel detachably connected to said sleeve, an inner wheel having a hub portion rotatably supported on said sleeve, a brake means having a hub portion rotatably supported by said inner wheel hub portion, said brake means comprising gear means differentially engaging gear means connected to said inner wheel and other gear means connected to said sleeve.

8. In a differential dual wheel assembly, in combination, a sleeve adapted to be rotatably supported on a spindle, said sleeve having an outer cylindrical bearing surface uninterrupted by any outwardly radially extending projection for a substantial portion of its axial length and to and including one end thereof, two wheels and a brake means coaxially supported on said sleeve, one of said wheels being removably secured to said sleeve for rotation therewith at said one end of said sleeve by fastening means exterior to the wheel assembly and the other wheel and brake means being rotatably supported on said bearing surface, said wheels and brake means being capable of relative rotation, differentially connected, axially positioned on said sleeve by said fastening means, and slidably removable from said sleeve over said one end thereof upon the unfastening of said fastening means.

9. In a differential dual wheel assembly, in combination, a sleeve adapted to be rotatably supported on a spindle, said sleeve having an outer cylindrical bearing surface uninterrupted by any outwardly radially extending projection for a substantial portion of its axial length and to and including one end thereof, an inner wheel and brake means coaxially and rotatably supported on said surface, an outer wheel, means exterior to said outer wheel removably fastening it to said sleeve at said one end thereof, said wheels and brake means being capable of relative rotation, differentially connected, and slidably removable from said sleeve over said one end thereof upon the unfastening of said fastening means.

CHARLES S. ASH.

REFERENCES CITED

The following references are of record in the file of this patent:

UNITED STATES PATENTS

| Number | Name | Date |
| --- | --- | --- |
| 2,214,457 | Fuhrman | Sept. 10, 1940 |
| 2,251,538 | Ash | Aug. 5, 1941 |